United States Patent
Tang et al.

(10) Patent No.: US 8,320,077 B1
(45) Date of Patent: Nov. 27, 2012

(54) METHOD AND SYSTEM FOR PROVIDING A HIGH MOMENT FILM

(75) Inventors: Yunjun Tang, Pleasanton, CA (US); Yun-Fei Li, Fremont, CA (US); Yingjian Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 796 days.

(21) Appl. No.: 12/334,753

(22) Filed: Dec. 15, 2008

(51) Int. Cl.
*G11B 5/127* (2006.01)
*G11B 5/147* (2006.01)
*G11B 5/31* (2006.01)

(52) U.S. Cl. ......... 360/125.12; 360/125.08; 360/125.45; 360/125.5

(58) Field of Classification Search ............ 360/125.08, 360/125.12, 125.24, 125.26, 125.28, 125.45, 360/125.58, 125.63, 125.69, 125.5
See application file for complete search history.

(56) References Cited

U.S. PATENT DOCUMENTS

| | | | |
|---|---|---|---|
| 6,163,442 A | 12/2000 | Gill et al. | |
| 6,687,085 B2 | 2/2004 | Minor et al. | |
| 6,778,357 B2 | 8/2004 | Tabakovic et al. | |
| 6,778,358 B1 * | 8/2004 | Jiang et al. | 360/125.5 |
| 6,791,796 B2 | 9/2004 | Shukh et al. | |
| 6,822,829 B2 | 11/2004 | Minor et al. | |
| 7,038,882 B2 | 5/2006 | Crue et al. | |
| 7,102,854 B2 | 9/2006 | Wang et al. | |
| 7,177,117 B1 * | 2/2007 | Jiang et al. | 360/125.12 |
| 7,233,458 B2 | 6/2007 | Brusca et al. | |
| 7,294,418 B2 | 11/2007 | Ikeda et al. | |
| 7,382,574 B2 | 6/2008 | Li et al. | |
| 7,522,377 B1 * | 4/2009 | Jiang et al. | 360/125.12 |
| 2002/0021529 A1 | 2/2002 | He et al. | |
| 2003/0133223 A1 * | 7/2003 | Minor | 360/125 |
| 2003/0133224 A1 * | 7/2003 | Minor et al. | 360/125 |
| 2004/0004786 A1 * | 1/2004 | Shukh et al. | 360/126 |
| 2004/0072036 A1 | 4/2004 | Kubota et al. | |
| 2004/0120074 A1 * | 6/2004 | Okada et al. | 360/126 |
| 2006/0044680 A1 * | 3/2006 | Liu et al. | 360/126 |
| 2006/0119981 A1 * | 6/2006 | Li et al. | 360/125 |
| 2006/0209458 A1 | 9/2006 | Kane et al. | |

FOREIGN PATENT DOCUMENTS

JP 2003229310 A 8/2003

OTHER PUBLICATIONS

N.X. Sun, et al., "High-Frequency Behavior and Damping of Fe-Co-N-Based High-Saturation Soft Magnetic Films", IEEE Transactions on Magnetics, vol. 38, No. 1, Jan. 2002, pp. 146-150.

H.S. Jung, et al., "Influence of underlayers on the soft properties of high magnetization FeCo films", Journal of Applied Physics, vol. 93, No. 10, May 15, 2003, pp. 6462-6464.

(Continued)

*Primary Examiner* — Craig A. Renner
*Assistant Examiner* — Adam B Dravininkas

(57) ABSTRACT

A method and system for providing a high moment film are disclosed. The high moment film might be used in structures, such as a pole, of a magnetic transducer. The method and system includes providing a plurality of high moment layers and at least one soft magnetic layer interleaved with and ferromagnetically coupled with the plurality of high moment layers. Each of the plurality of high moment layers has a magnetic moment of greater than 2.4 Tesla. The at least one soft magnetic layer has a hard axis coercivity of not more than twenty Oersted. The high moment film has a total thickness of at least one thousand Angstroms.

21 Claims, 4 Drawing Sheets

OTHER PUBLICATIONS

Kenji Ikeda, et al., "Multilayer nanogranular magnetic thin films for GHz applications", Journal of Applied Physics vol. 92, No. 9, Nov. 1, 2002, pp. 5395-5400.

M. Vopsaroiu, et al. "Preparation of high moment CoFe films with controlled grain size and coercivity", Journal of Applied Physics 97, 10N301-1, (2005), 3 pages.

N.X. Sun, et al, "Soft High Saturation Magnetization $(Fe0.7Co0.3)1-xNx$ Thin Films for Inductive Write Heads", IEEE Transactions on Magnetics, vol. 36, No. 5, Sep. 2000, pp. 2506-2508.

H. Katada, et al, "Soft Magnetic Properties and Microstructure of NiFe(Cr)/FeCo/NiFe(Cr) Films With Large Saturation Magnetization", IEEE Transactions on Magnetics, vol. 38, No. 5, Sep. 2002, pp. 2225-2227.

* cited by examiner

METHOD AND SYSTEM FOR PROVIDING A HIGH MOMENT FILM

BACKGROUND

FIG. 1 depicts a conventional magnetic recording head 10 used in recording to and reading from a media (not shown). The conventional magnetic recording head 10 includes a read transducer 12 and a write transducer 20. The conventional read transducer 12 includes shields 14 and 18 and a read sensor 16. The conventional write transducer 20 may be a perpendicular magnetic recording (PMR) transducer or a longitudinal magnetic recording transducer. The conventional write transducer 20 includes a first pole 22 that may be merged with shield 18, a first coil 24, an auxiliary pole 26, a main pole 28, write gap 30, a second coil 32, and a return shield 34.

In the conventional PMR transducer 10, the conventional first pole 22, main pole 28, and auxiliary pole 26 are desired to be made of a high moment material. In addition, the high moment materials are desired to be magnetically soft and have a high permeability. Various materials have been proposed for use in the conventional pole 28. However, such films typically have drawbacks such as a significant remanent magnetization that results in domain lockup, reduced magnetic moment that results in a lower write field, a thickness that is too small to have a sufficient magnetic flux for use in a write transducer 20, and/or lower permeability that results in poor high frequency response. Consequently, such conventional films are still not appropriate for use in the pole 28.

SUMMARY

A method and system for providing a high moment film are disclosed. The high moment film might be used in structures, such as a pole, of a magnetic transducer. The method and system includes providing a plurality of high moment layers and at least one soft magnetic layer interleaved with and ferromagnetically coupled with the plurality of high moment layers. Each of the plurality of high moment layers has a magnetic moment of greater than 2.4 Tesla. The at least one soft magnetic layer has a hard axis coercivity of not more than twenty Oersted. The high moment film has a total thickness of at least one thousand Angstroms.

DETAILED DESCRIPTION OF THE PREFERRED EMBODIMENTS

Figure 1:
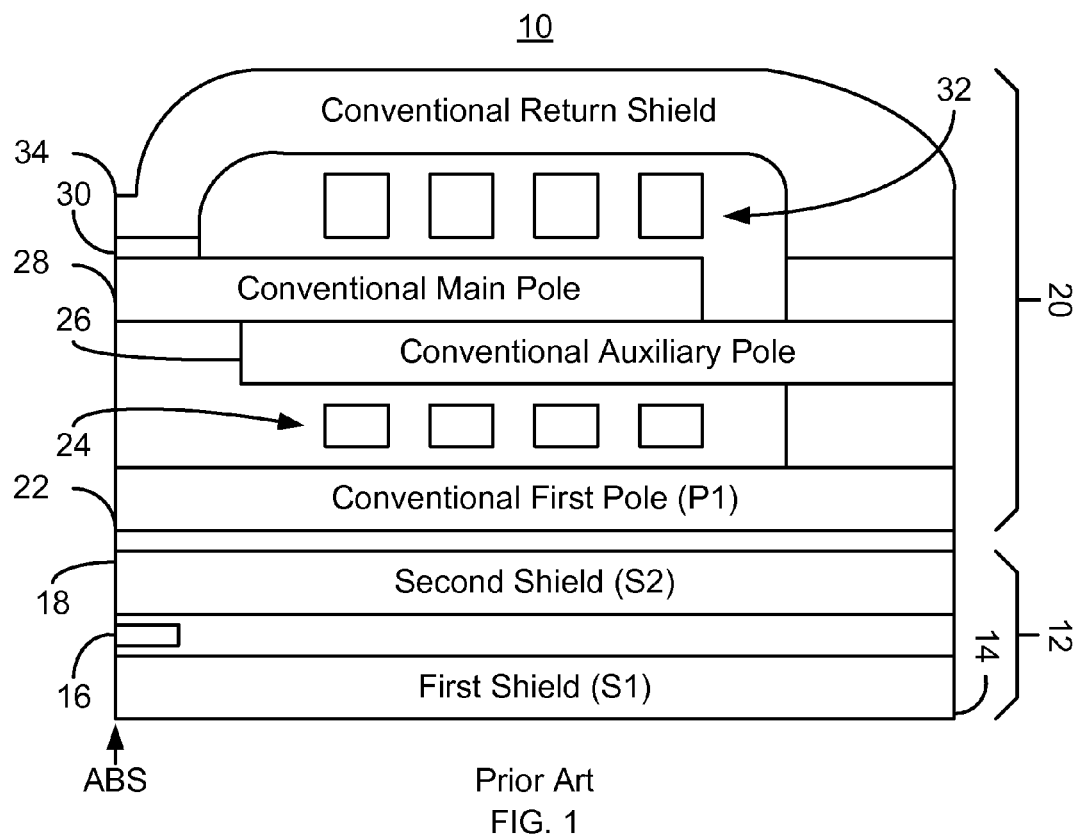
FIG. 1 depicts a conventional PMR transducer.
Figure 2:
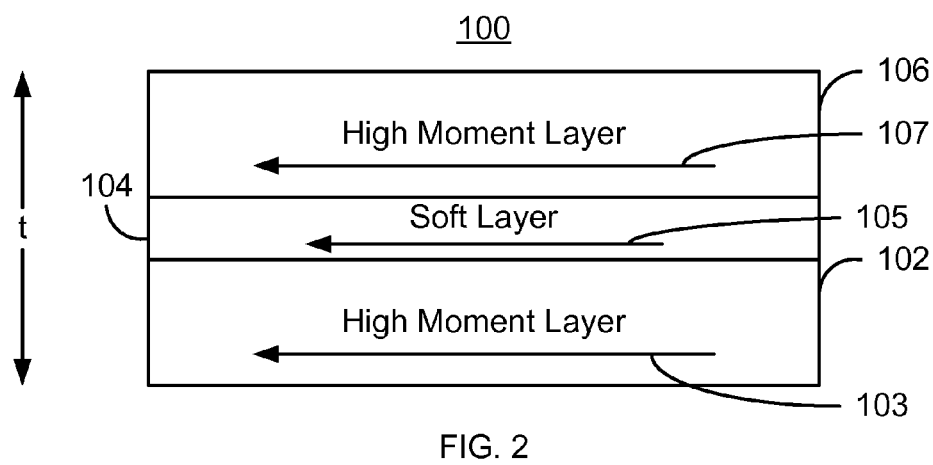
FIG. 2 depicts an exemplary embodiment of a high magnetic moment film.

FIG. 2 depicts an exemplary embodiment of a high magnetic moment film 100. For clarity, FIG. 2 is not to scale. The film 100 may be used in a device, such as a write transducer (not shown in FIG. 2). Such a transducer may be part of a merged head that also includes a read head (not shown) and resides on a slider (not shown) in a disk drive.

In the embodiment shown, the film 100 includes multiple high moment layers 102 and 106 separated by a soft magnetic layer 104. Although only two high moment layers 102 and 106 are shown, more high moment layers may be included. Further, each of the high moment layers 102 and 106 would be interleaved with soft magnetic layers analogous to the soft magnetic layer 104. Thus, any high moment layer, such as the layers 102 and 106, would be adjacent to one or more soft layers, such as the layer 104, and vice versa. In any embodiment, the film 100 includes at least two high moment layers. In some embodiments up to sixteen high moment layers, such as the layers 102 and 106, may be employed.

The high moment layers 102 and 106 have magnetizations 103 and 107, respectively. Each of the high moment layers 102 and 106 has a moment that is greater than 2.4 Tesla. Consequently, high moment materials may be used for the high moment layers 102 and 106. For example, the high moment layers 102 and/or 106 may include $Fe_XCo_YN_Z$, where X+Y+Z equals one hundred, X is greater than or equal to twenty, Y is less than or equal to eighty, and Z is greater than or equal to zero. Although the magnetizations 103 and 107 are shown as being equal, they may differ in magnitude as long as the magnetization of each layer 102 and 106 is at least 2.4 T. Further, the high moment layers 102 and 106 may be thick. Each of the high moment layers 102 and 106 may have a thickness of at least one hundred Angstroms and not more than one thousand Angstroms. In some such embodiments, the high moment layers 102 and 106 each has a thickness of at least three hundred fifty Angstroms and not more than four hundred fifty Angstroms. Further, the high moment film 100 is also thick, having a thickness, t, of at least one thousand Angstroms. Regardless of the thickness of each of the layers 102, 104, and 106, the high moment film 100 has a total thickness of at least one thousand Angstroms. In some embodiments the thickness of the high moment film 100 may be at least two thousand Angstroms. In one such embodiment, the high moment film 100 may be not more than three thousand Angstroms thick.

The soft magnetic layer 104 is interleaved with the high moment layers 102 and 106. The soft magnetic layer 104 is also magnetic and has a magnetization 105. However, the moment of the soft magnetic layer 104 may be less than that of the high moment layers 102 and 106. The soft magnetic layer 104 is considered to be soft and have a high permeability. For example, the hard axis coercivity of the soft magnetic layer 104 is not more than twenty Oersteds. In some embodiments, the hard axis coercivity may be not more than five Oersteds. Soft materials, such as one or more of at FeCoB, FeCoZr, FeCoNb, and $Ni_XFe_Y$, where X+Y equals one hundred, and X is at least thirty and not greater than ninety; may be used in the soft magnetic layer 104. For example, in one such embodiment, the soft magnetic layer 104 may include $Ni_{81}Fe_{19}$. In another embodiment, $Ni_{55}Fe_{45}$ may be employed.

In addition to being interleaved with the high moment layers 102 and 106, the soft magnetic layer 104 is ferromagnetically coupled with the high moment layers 102 and 106. Thus, the magnetizations 103, 105, and 107 of the layers 102, 104, and 106 are in the same direction. The magnetizations 103, 105, and 107 are shown as being in plane and in a particular direction. In another embodiment, the magnetizations 103, 105, and 107 may be in another direction, including partially or completely out of plane. However, as the magnetizations 103, 105, and 107 are ferromagnetically coupled, at equilibrium they are all substantially in the same direction.

In addition to generally having a lower moment than the high moment layers 102 and 106, the soft magnetic layer 104 generally has a lower thickness than that of the high moment layers 102 and 106. The thickness of the soft magnetic layer 104 is at least ten and not more than fifty Angstroms. In one such embodiment, the soft magnetic layer 104 has a thickness of at least thirteen Angstroms and not more than seventeen Angstroms.

The film 100 may have a high moment. In one embodiment, the moment of the film 100 is at least 2.4 Tesla. Further, the film 100 may be sufficiently soft and have a sufficiently high permeability for use in a magnetic transducer. For example, the film 100 may have a small, or zero, remanent field as well as a substantially square easy axis B-H loop. Issues such as domain lockup may thus be reduced or eliminated. The improved permeability may aid in the higher frequency response of the film 100. This may be achieved substantially without adversely affecting the magnitude of the field produced by the high moment of the film 100. Consequently, writeability of a magnetic transducer using the film 100 may be improved.

Figure 3:
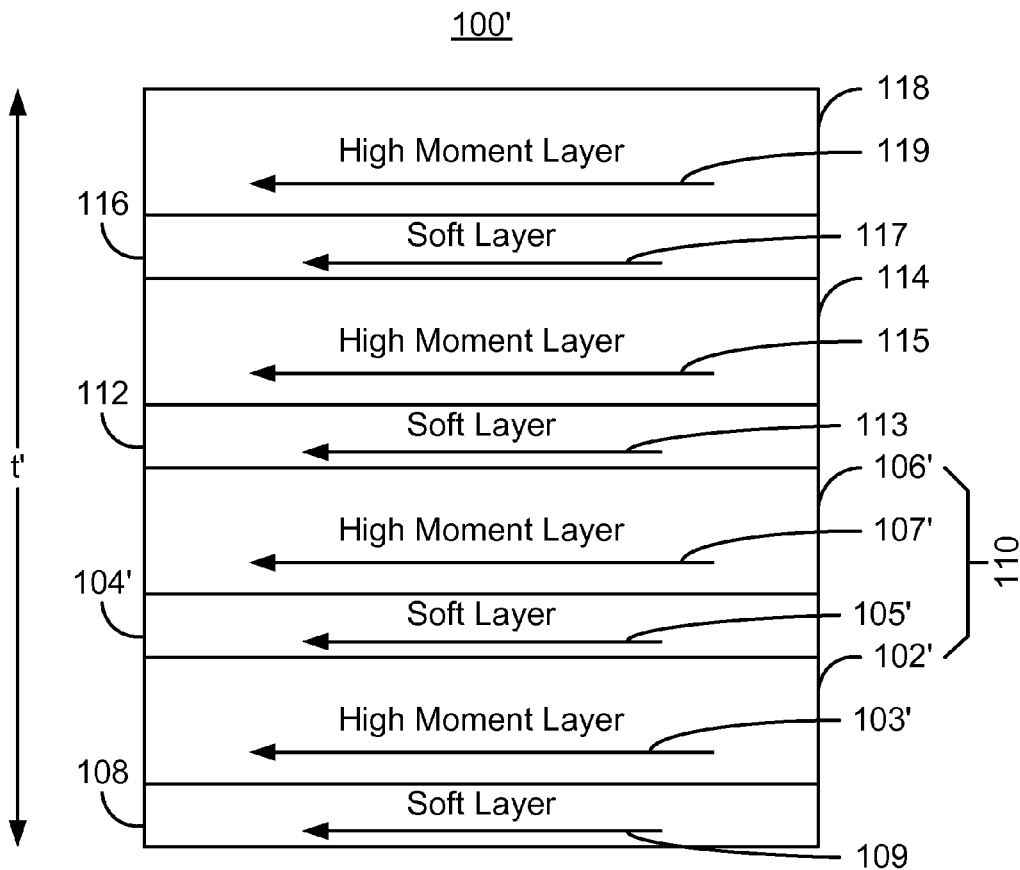
FIG. 3 depicts another exemplary embodiment of a high magnetic moment film.

FIG. 3 depicts another exemplary embodiment of a high magnetic moment film 100'. For clarity, FIG. 3 is not to scale. The film 100' is analogous to the film 100. Consequently, analogous portions of the film 100' are labeled similarly to the film 100. The film 100' thus includes high moment layers 102' and 106' having magnetizations 103' and 107', respectively, as well as soft layer 104' having magnetization 105'. The film 100' may be used in a device, such as a write transducer (not explicitly shown). Such a transducer may be part of a merged head that also includes a read head (not shown) and resides on a slider (not shown) in a disk drive.

Figure 3A:
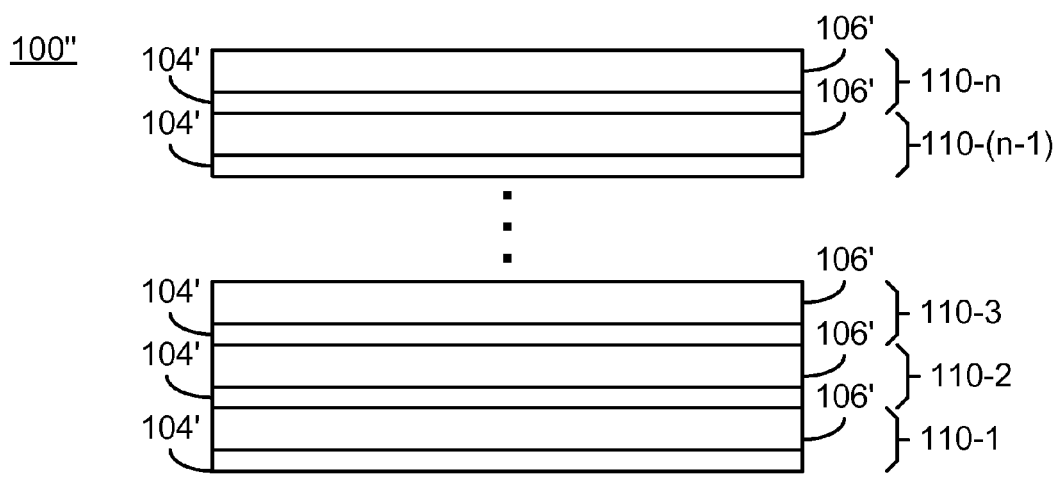
FIG. 3A depicts another exemplary embodiment of a high magnetic moment film

In addition, the film 100' includes soft layer 108 having magnetization 109 below the high moment layer 102'. The film 100' also includes soft layers 112 and 116 having magnetizations 113 and 117, respectively, as well as high moment layers 114 and 118 having magnetizations 115 and 119, respectively. The high moment layers 114 and 118 are analogous to high moment layers 102' and 106'. Similarly, the soft layers 108, 112, and 116 are analogous to soft layer 104'. The high moment layers 102', 106', 114', and 118' are interleaved with soft layers 108, 104', 112, and 116. Thus, each high moment layer 102', 106', 114', and 118' is adjacent to soft layers soft layers 108 and 104', 104' and 112, 112 and 116, and 116, respectively. The film 100' may, therefore, be considered to be formed of repetitions of the bilayer 110, which have been repeated four times. In other embodiments, the bilayer 110 may be repeated another number of times. For example, FIG. 3A depicts an embodiment of the film 100'' in which there are n bilayers that are analogous to the bilayer 110. These bilayers are 110-1, 110-2, 110-3 . . . 110-(n–1), and 110-n. In the embodiment shown, n may be two through sixteen. Each bilayer includes a soft magnetic layer 104' and a high moment layer 106' analogous to those in the film 100'. Thus, referring back to FIG. 3, although four repetitions are shown, the bilayer 110 might be repeated two through sixteen times.

Each of the high moment layers 102', 106', 114, and 118 has a moment that is greater than 2.4 Tesla. Consequently, materials such as $Fe_XCo_YN_Z$, where X+Y+Z equals one hundred and X is greater than or equal to twenty, Y is less than or equal to eighty, and Z is greater than or equal to zero, may be used for the high moment layers 102', 106', 114, and 118. Although shown as being equal, the magnetizations 103', 107', 115, and 119 may differ in magnitude as long as the magnetization 103', 107', 115, and 119 of each layer 102', 106', 114, and 118 is at least 2.4 T. Further, the high moment layers 102', 106', 114, and 118 may be thick. Each of the high moment layers 102', 106', 114, and 118 may have a thickness of at least one hundred Angstroms and not more than one thousand Angstroms. In some such embodiments, the high moment layers 102', 106', 114, and 118 each has a thickness of at least three hundred fifty Angstroms and not more than four hundred fifty Angstroms. Further, the high moment film 100' is also thick, having a thickness t', of at least one thousand Angstroms. In some embodiments the t' may be at least two thousand Angstroms. In one such embodiment, t' may be not more than three thousand Angstroms.

The soft magnetic layers 108, 104', 112, and 116 are interleaved with the high moment layers 102', 106', 114, and 118. The soft magnetic layers 108, 104', 112, and 116 are magnetic, having magnetizations 109, 105', 113, and 117 respectively. However, the moments of the soft magnetic layers 108, 104', 112, and 116 may be less than that of the high moment layers 102', 106', 114, and 118. Although depicted as being the same, the magnetizations 109, 105', 113, and 117 may differ in magnitude. The soft magnetic layers 108, 104', 112, and 116 are magnetically soft and have a high permeability. Consequently, the hard axis coercivity of each of the soft magnetic layers 108, 104', 112, and 116 is not more than twenty Oersteds. In some embodiments, the hard axis coercivity of the soft magnetic layers 108, 104', 112, and 116 may not be more than five Oersteds. Materials, for example one or more of at FeCoB, FeCoZr, FeCoNb, and $Ni_XFe_Y$, where X+Y equals one hundred, and X is at least thirty and not greater than ninety, may be used in the soft magnetic layers 108, 104', 112, and 116 104. For example, in one such embodiment, the soft magnetic layer 104 may include $Ni_{81}Fe_{19}$ may be used. In another embodiment, $Ni_{55}Fe_{45}$ may be employed.

In addition to generally having a lower moment than the high moment layers 102', 106', 114, and 118, the soft magnetic layers 108, 104', 112, and 116 generally has a lower thickness than that of the high moment layers 102', 106', 114, and 118. The thickness of each of the soft magnetic layers 108, 104', 112, and 116 is at least ten and not more than fifty Angstroms. In one such embodiment, each of the soft magnetic layers 108, 104', 112, and 116 has a thickness of at least thirteen Angstroms and not more than seventeen Angstroms.

The high moment layers 102', 106', 114, and 118 and the soft magnetic layers 108, 104', 112, and 116 are interleaved and ferromagnetically coupled. Thus, the magnetizations 109, 103', 105', 107', 113, 115, 117, and 119 of the layers 108, 102', 104', 106', 112, 114, and 118 are in the same direction. Although the magnetizations 109, 103', 105', 107', 113, 115, 117, and 119 are shown as being in plane and in a particular direction, they may be in another direction, including partially or completely out of plane. However, as the magnetizations 109, 103', 105', 107', 113, 115, 117, and 119 are ferromagnetically coupled, at equilibrium they are all substantially in the same direction.

Like the film 100, the film 100' may have a high moment, yet may be sufficiently soft and have a sufficiently high permeability for use in a magnetic transducer. For example, the film 100' may have a small, or zero, remanent field. Issues such as domain lockup may thus be reduced or eliminated. Further, the high frequency response may be improved by the permeability of the film 100'. This is achieved without adversely affecting the magnitude of the field produced by the high moment of the film 100'. Consequently, writeability of a magnetic transducer using the film 100' may be improved.

Figure 4:
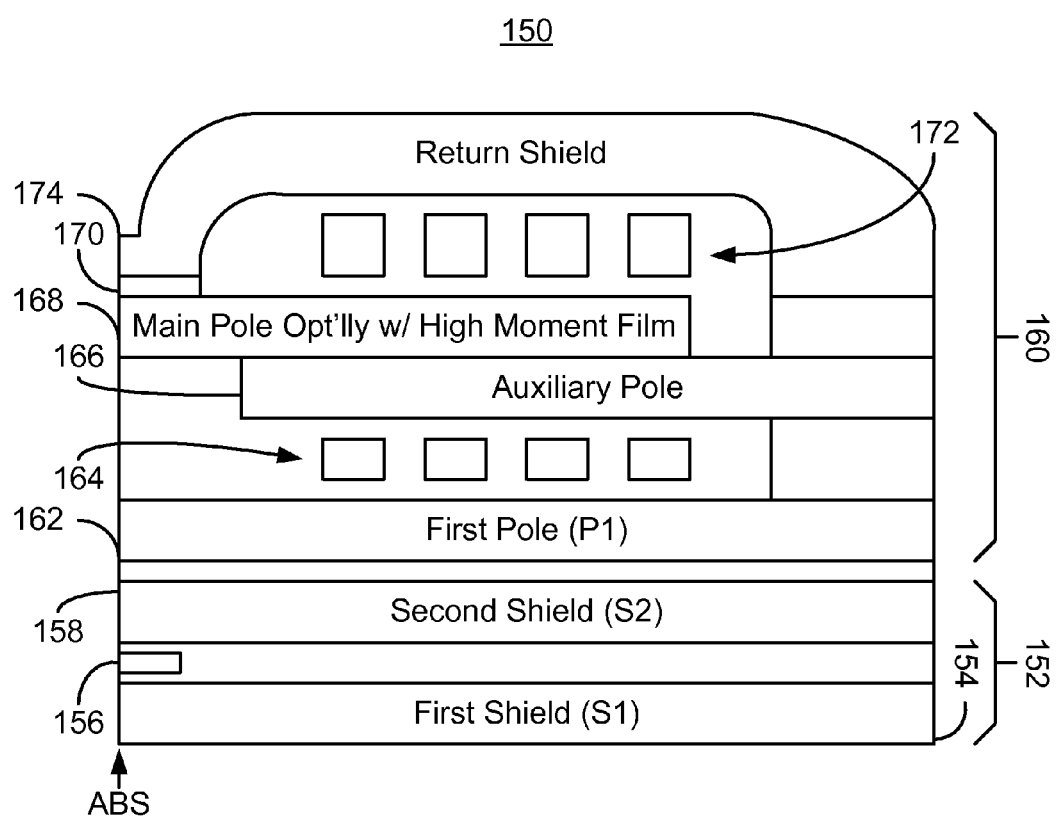
FIG. 4 depicts an exemplary embodiment of a magnetic transducer utilizing an exemplary embodiment of a high magnetic moment film.

FIG. 4 depicts an exemplary embodiment of a magnetic transducer 150 utilizing an exemplary embodiment of a high magnetic moment film, such as the films 100 and/or 100'. The transducer 150 being fabricated may be part of a merged head that also includes a read head 152 and resides on a slider (not shown) in a disk drive. The read transducer 152 includes shields 154 and 158 and a read sensor 156. The write transducer 160 may be a PMR transducer or a longitudinal magnetic recording transducer. The write transducer 160 includes a first pole 162 that may be merged with shield 158, a first coil 164, an auxiliary pole 166, a main pole 168, write gap 170, a second coil 17, and a return shield 174.

A high moment soft film, such as the films 100 and 100', may be desired to be used in a pole, such as the main pole 168. Because the films such as the films 100 and/or 100' may be used in poles such as the main pole 168, the main pole 168 may have a high moment, be soft, and have a high permeability at the read and write frequencies. Consequently, issues such as domain lockup may be ameliorated. Consequently, performance may be improved.

Figure 5:
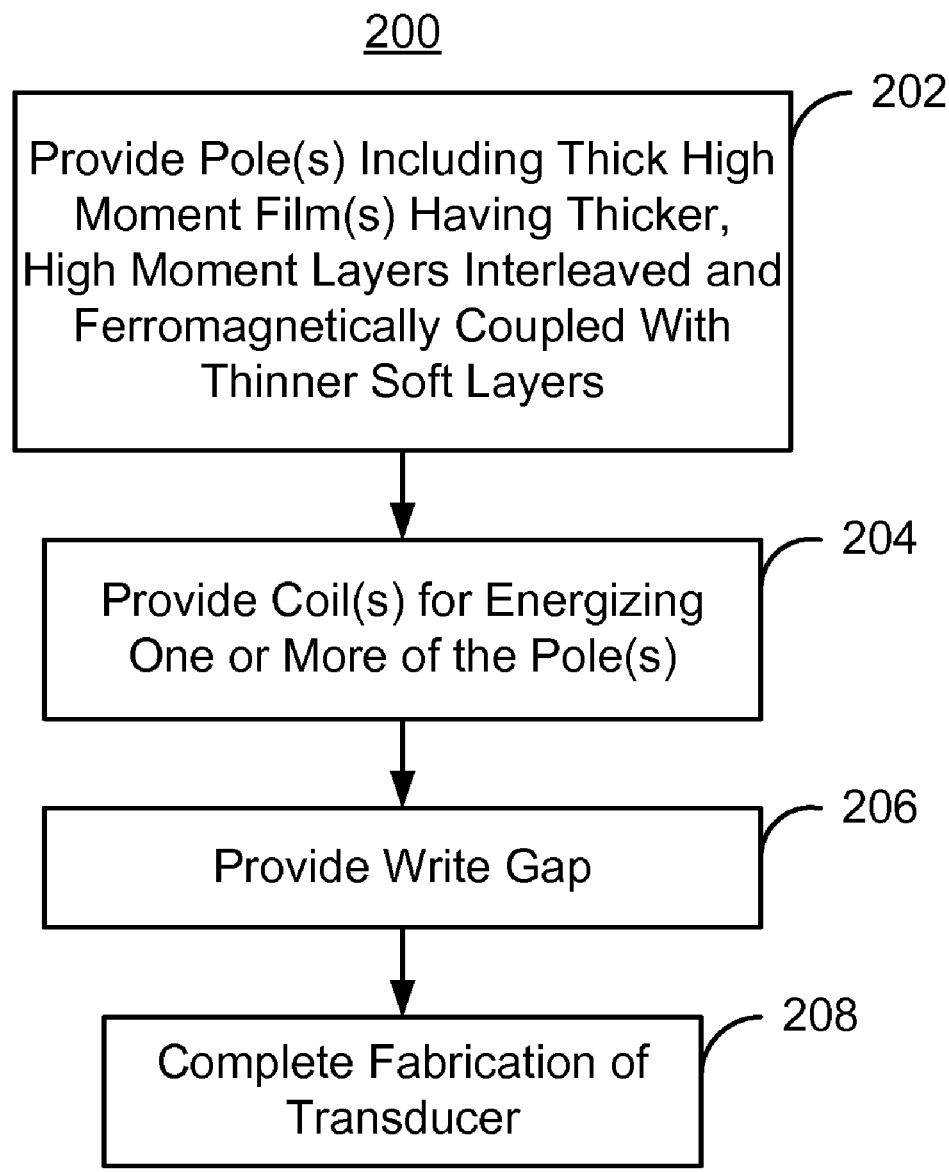
FIG. 5 is a flow chart depicting an exemplary embodiment of a method for providing a magnetic transducer including a high magnetic moment film.

FIG. 5 is a flow chart depicting an exemplary embodiment of a method 200 for providing a magnetic transducer including a high magnetic moment film. For simplicity, some steps may be omitted. The method 200 is described in the context of the films 100/100' and transducer 150 in FIGS. 2-4. However, the method 200 may be used to form another device (not shown). The method 200 is also described in the context of providing a single transducer. However, the method 200 may be used to fabricate multiple transducers at substantially the same time. The method 200 and device 150 are also described in the context of particular layers. However, in some embodiments, such layers may include multiple sublayers.

Referring to FIGS. 2-5, at least one pole having at least one thick, high moment film is provided, via step 202. The high moment film includes multiple high moment layers and at least one soft magnetic layer interleaved with and ferromagnetically coupled with the high moment layers. The thick, high moment film has a thickness of at least one thousand Angstroms. In some embodiments, the high moment film is at least two thousand Angstroms thick. However, in some embodiments, the high moment film is not thicker than three thousand Angstroms. The high moment film also has a magnetic moment of at least 2.4 Tesla.

Each high moment layer of the high moment film has a magnetic moment of greater than 2.4 Tesla and is relatively thick. For example, the thickness of each high moment layer may be at least one hundred and not more than one thousand Angstroms. In some embodiments, the thickness of each high moment layer is at least three hundred and fifty Angstroms and not more than four hundred and fifty Angstroms.

Each soft magnetic layer of the high moment film has a hard axis coercivity of not more than five Oersted and is relatively thin. For example, each soft magnetic layer may have a thickness of at least ten and not more than fifty Angstroms. In some embodiments, each soft magnetic layer provided in step 202 may have a thickness of at least thirteen Angstroms and not more than seventeen Angstroms. The high moment film(s) provided in step 202 are, therefore, analogous to the films 100 and/or 100'. The pole provided in step 202 thus correspond a pole such as the main pole 168 of the transducer 150.

Step 202 may including plating, sputtering, or otherwise alternately depositing the high moment layers 102 and 104/102', 104', 114, and 118 with the soft layers 104/108, 104', 112, and 116. For example, step 202 may include depositing a high moment layer including $Fe_XCo_YN_Z$, where X+Y+Z equals one hundred and X is greater than or equal to twenty, Y is less than or equal to eighty, and Z is greater than or equal to zero. Step 202 may also include depositing on the high moment layer a soft layer. The soft layer may include, for example at least one of FeCoB, FeCoZr, FeCoNb, and $Ni_XFe_Y$, where X+Y equals one hundred, and X is at least three and not greater than ninety. In one embodiment, $Ni_{81}Fe_{19}$ might be used. In another embodiment, $Ni_{55}Fe_{45}$ might be used. This process may be repeated until there are at least two high moment layers. In one embodiment, step 202 includes repeatedly depositing high moment and soft layers until not more than sixteen high moment layers have been provided. Deposition in trench(es), photolithography, ion milling, and/or other mechanisms for shaping the film 100/100' into a pole may also be utilized in step 202. Other processing, for example annealing, may be included as part of depositing the film 100/100' in step 202.

One or more coils for energizing the pole(s) are provided, via step 204. Step 204 may include, for example, formation of the coils 164 and 172. Although pancake coils are shown in FIG. 4, solenoidal coils might be fabricated in another embodiment. A write gap, such as the gap 168 may also be formed, via step 206. Fabrication of the transducer 150 is completed, via step 208.

Thus, using the method 200 a transducer, such as the transducer 150 may be provided. Because high moment film(s), such as the films 100 and/or 100' are used, the transducer 150 formed using the method 200 may have improved permeability and reduced domain lockup, but still have a sufficiently high moment. As a result, writeability and performance may be enhanced.

We claim:

1. A high moment film comprising:
a plurality of high moment layers, each of the plurality of high moment layers having a magnetic moment of greater than 2.4 Tesla and including $Fe_XCo_YN_Z$, where X+Y+Z=100 and X is greater than or equal to twenty, Y is less than or equal to eighty, and Z is greater than zero; and
at least one soft magnetic layer interleaved with and ferromagnetically coupled with the plurality of high moment layers, the at least one soft magnetic layer having a hard axis coercivity of not more than twenty Oersteds, each of the at least one soft magnetic layer including at least one of FeCoB, FeCoZr and FeCoNb;
wherein the high moment film has a total thickness of at least one thousand Angstroms.

2. The high moment film of claim 1 wherein the hard axis coercivity of the at least one soft magnetic layer is not more than five Oersteds.

3. The high moment film of claim 1 wherein the plurality of high moment layers includes greater than two high moment layers.

4. A magnetic transducer comprising:
a pole having a high moment film including a plurality of high moment layers and at least one soft magnetic layer interleaved with and ferromagnetically coupled with the plurality of high moment layers, each of the plurality of the high moment layers having a magnetic moment of greater than 2.4 Tesla and including $Fe_XCo_YN_Z$, where X+Y+Z=100 and X is greater than or equal to twenty, Y is less than or equal to eighty, and Z is greater than zero, the at least one soft magnetic layer having a hard axis coercivity of not more than twenty Oersted, the high moment film having a total thickness of at least one thousand Angstroms, each of the at least one soft magnetic layer including at least one of FeCoB, FeCoZr and FeCoNb; and
a coil for energizing the pole.

5. The magnetic transducer of claim 4 wherein the hard axis coercivity of the at least one soft magnetic layer is not more than five Oersteds.

6. The magnetic transducer of claim 4 wherein the plurality of high moment layers includes not more than sixteen high moment layers.

7. The magnetic transducer of claim 4 wherein the total thickness is at least two thousand Angstroms.

8. The magnetic transducer of claim 7 wherein the total thickness is not more than three thousand Angstroms.

9. The magnetic transducer of claim 4 wherein the at least one soft magnetic layer has a thickness of at least ten and not more than fifty Angstroms and each of the plurality of high moment layers has a thickness of at least one hundred and not more than one thousand Angstroms.

10. The magnetic transducer of claim 9 wherein the at least one soft magnetic layer has a thickness of at least thirteen Angstroms and not more than seventeen Angstroms and each of the plurality of high moment layers has a thickness of at least three hundred fifty Angstroms and not more than four hundred fifty Angstroms.

11. The magnetic transducer of claim 4 wherein the plurality of high moment layers includes greater than two high moment layers.

12. A disk drive comprising:
  a slider;
  a magnetic transducer coupled with the slider, the magnetic transducer including a pole and a coil for energizing the pole, the pole having a high moment film including a plurality of high moment layers and at least one soft magnetic layer interleaved with and ferromagnetically coupled with the plurality of high moment layers, each of the plurality of high moment layers having a magnetic moment of at least 2.4 Tesla and including $Fe_XCo_YN_Z$, where $X+Y+Z=100$ and X is greater than or equal to twenty, Y is less than or equal to eighty, and Z is greater than zero, each of the at least one soft magnetic layer having a hard axis coercivity of not more than twenty Oersted, the high moment film having a total thickness of greater than one thousand Angstroms, each of the at least one soft magnetic layer including at least one of FeCoB, FeCoZr and FeCoNb.

13. The disk drive of claim 12 wherein the plurality of high moment layers includes greater than two high moment layers.

14. A method for fabricating a magnetic transducer having an air-bearing surface (ABS) comprising:
  providing a pole having a high moment film including a plurality of high moment layer and at least one soft magnetic layer interleaved with and ferromagnetically coupled with the plurality of high moment layers, each of the plurality of high moment layers having a magnetic moment of greater than 2.4 Tesla and including $Fe_XCo_YN_Z$, where $X+Y+Z=100$ and X is greater than or equal to twenty, Y is less than or equal to eighty, and Z is greater than zero, each of the at least one soft magnetic layer having a hard axis coercivity of not more than twenty Oersted, the high moment film having a total thickness of at least one thousand Angstroms, each of the at least one soft magnetic layer including at least one of FeCoB, FeCoZr and FeCoNb; and
  providing a coil for energizing the pole.

15. The method of claim 14 wherein the hard axis coercivity of the at least one soft magnetic layer is not more than five Oersteds.

16. The method of claim 14 wherein the step of providing the pole further includes:
  providing not more than sixteen high moment layers.

17. The method of claim 14 wherein the total thickness is at least two thousand Angstroms.

18. The method of claim 17 wherein the total thickness is not more than three thousand Angstroms.

19. The method of claim 14 wherein each of the at least one soft magnetic layer has a thickness of at least ten and not more than fifty Angstroms and each of the plurality of high moment layers has a thickness of at least one hundred and not more than one thousand Angstroms.

20. The method of claim 19 wherein the step of providing the pole further includes:
  providing each of the at least one soft magnetic layer with a thickness of at least thirteen Angstroms and not more than seventeen Angstroms; and
  providing each of the plurality of high moment layers with a thickness of at least three hundred fifty Angstroms and not more than four hundred fifty Angstroms.

21. The method of claim 14 wherein the plurality of high moment layers includes greater than two high moment layers.

* * * * *